United States Patent [19]

Hatanaka et al.

[11] Patent Number: 4,963,955

[45] Date of Patent: Oct. 16, 1990

[54] PHOTOELECTRIC CONVERSION APPARATUS

[75] Inventors: Katsunori Hatanaka, Yokohama; Katsumi Nakagawa, Kawasaki; Masaki Fukaya, Yokohama; Soichiro Kawakami, Sagamihara, all of Japan

[73] Assignee: Canon Kabushiki Kaisha, Tokyo, Japan

[21] Appl. No.: 403,031

[22] Filed: Sep. 1, 1989

Related U.S. Application Data

[63] Continuation of Ser. No. 281,872, Dec. 7, 1988, abandoned, which is a continuation of Ser. No. 849,442, Apr. 8, 1986, abandoned.

[30] Foreign Application Priority Data

Apr. 11, 1985 [JP] Japan .................................. 60-75279

[51] Int. Cl.$^5$ ...................... H01L 27/14; H01L 45/00; H01L 29/78
[52] U.S. Cl. ......................................... 357/30; 357/2; 357/4; 357/23.7; 357/24; 357/32; 357/41; 357/45; 357/51; 358/213.12; 358/213.16; 358/213.27; 358/213.28; 358/213.29; 377/61
[58] Field of Search ............... 357/24 LR, 24, 2, 23.1, 357/4, 23.7, 30 H, 30 D, 30 G, 30 I, 30 K, 41, 45, 51, 32; 358/213.12, 213.14, 213.16, 213.27, 213.28, 213.29; 377/61

[56] References Cited

U.S. PATENT DOCUMENTS

| | | | |
|---|---|---|---|
| 4,566,040 | 1/1986 | Ozawa et al. | 358/293 |
| 4,633,288 | 12/1986 | Herberg | 357/2 |
| 4,652,925 | 3/1987 | Kimata | 357/24 LR |
| 4,656,519 | 4/1987 | Savoye | 357/24 LR |
| 4,660,095 | 4/1987 | Cannella et al. | 357/24 LR |
| 4,665,325 | 5/1987 | Yamada et al. | 357/24 LR |

FOREIGN PATENT DOCUMENTS

| | | | |
|---|---|---|---|
| 53-114683 | 10/1978 | Japan | 357/23.7 |
| 57-52181 | 3/1982 | Japan | 357/30 K |
| 59-36961 | 2/1984 | Japan | 357/30 L |
| 59-213169 | 12/1984 | Japan | 357/4 |
| 60-111472 | 6/1985 | Japan | 357/4 |

Primary Examiner—Andrew J. James
Assistant Examiner—Ngan Van Ngo
Attorney, Agent, or Firm—Fitzpatrick, Cella, Harper & Scinto

[57] ABSTRACT

A photoelectric conversion apparatus in which a plurality of photoelectric conversion elements are arranged in an array, and the outputs of the photoelectric conversion elements are read. The apparatus includes a plurality of switching elements connected equivalently in parallel with the respective photoelectric conversion elements. The photoelectric conversion elements of a particular row or column are connected in series.

5 Claims, 10 Drawing Sheets

PHOTOELECTRIC CONVERSION APPARATUS

This application is a continuation of application Ser. No. 281,872 filed Dec. 7, 1988 which is a continuation of application Ser. No. 849,442 filed Apr. 8, 1986, both of which are abandoned.

BACKGROUND OF THE INVENTION

1. Field of the Invention

The present invention relates to photoelectric conversion apparatuses, and particularly to photoelectric conversion apparatuses in which a plurality of photoelectric conversion elements (hereinafter referred to as photosensor elements) are arranged in an array.

The photoelectric conversion apparatuses according to the present invention are applied to, for example, color or monochrome image sensors or the like, used with image readers, digital reproduction devices, or the like.

2. Related Background Art

Figure 1:
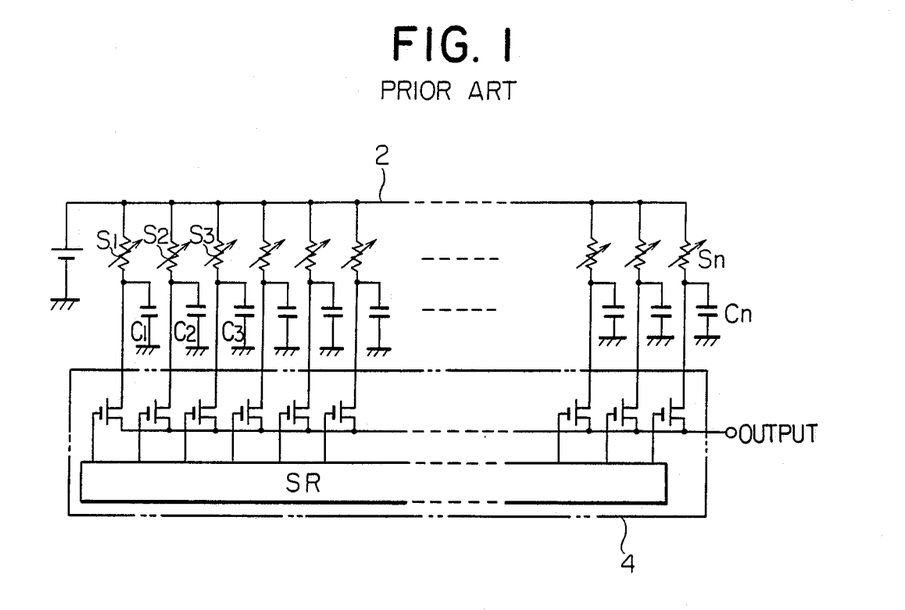
FIG. 1 is a schematic circuit diagram of a conventional monochrome type line image sensor.

FIG. 1 is a schematic circuit diagram of a conventional monochrome line image sensor. In FIG. 1, photocurrents corresponding to the quantities of incident light on respective sensor elements $S_1$–$S_n$ flow through the respective sensor elements and the quantities of electric charges corresponding to the respective photocurrents are stored as image signals in the corresponding capacitors $C_1$–$C_n$, and these image signals are output sequentially by a scanning circuit 4.

Figure 2:
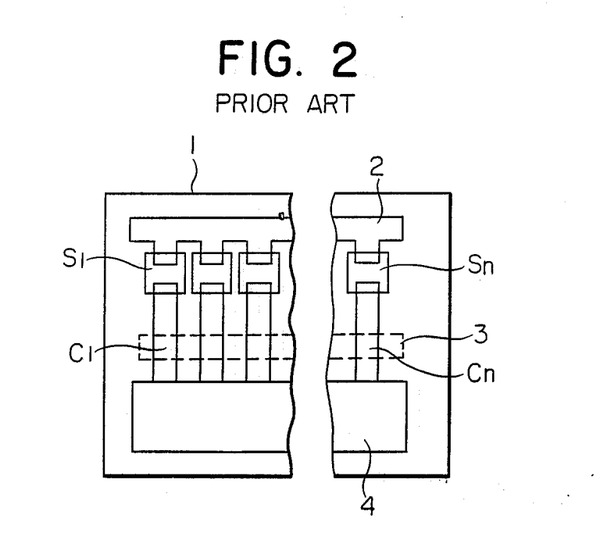
FIG. 2 diagrammatically shows the structure of the sensor.

FIG. 2 illustrates a diagrammatic structure of the conventional line sensor. In FIG. 2, photosensitive elements $S_1$–$S_n$, each including a photoconductive film of CdS, CdS/Se or the like, are formed in a line on a long substrate 1 of glass or the like. Terminals on one side of the photosensitive elements are connected to a common electrode 2 and the other-side terminals on the other side of the elements are connected via individual electrodes to corresponding parallel input terminals of the scanning circuit 4. Portions of the respective electrodes and an opposite grounding electrode 3 hold an insulation layer therebetween to form capacitors $C_1$–$C_n$.

The number of photosensitive elements $S_1$–$S_n$ required is 3,360 or more if, for example, an A4 sized (210 mm) document is to be read. This is because a reading resolution of more than 16 dots/mm is desirable if human eyesight characteristics are considered.

Recently, with the spread of personal computers and color printers, the demand for an image reader which can read color has increased. It is, however, very difficult to attain a compact color image reader using the conventional line image sensor.

First, in order to read color, one pixel must be constituted by three different-color (red, green, blue; hereinafter referred to as R, G, B) photosensitive elements. Thus, when the color of, for example, an A4-sized document is read, the number of photosensor elements required is $3,360 \times 3 = 10,080$. If all of these elements are arranged in lines, as shown in FIG. 2, the wiring pitches at the junctions of scanning circuit 4 will each be 20.8 $\mu$m, so that it is impossible to use wire bonding or heat seal junction techniques.

It is very difficult to form, with high stability and yield, such microwiring and microcircuits arranged on the same long substrate 1 using thin film techniques.

In order to solve such problem, matrix wiring used in area image sensors, etc., has been employed.

Figure 3:
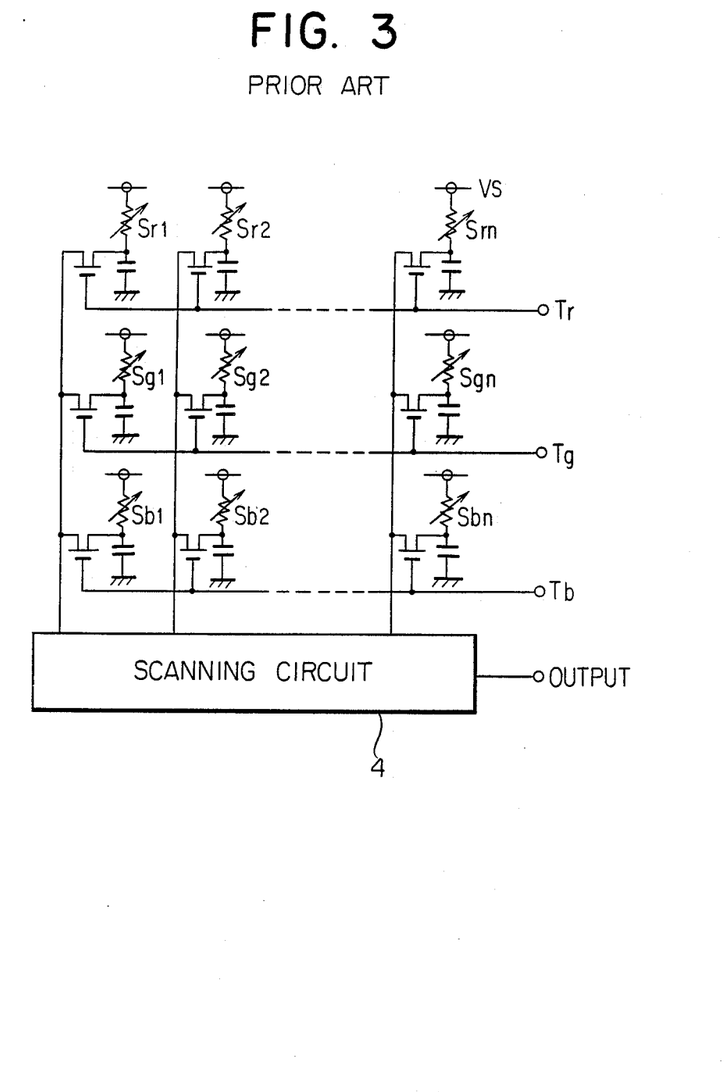
FIG. 3 is a schematic circuit diagram of a conventional color line image sensor with matrix wiring.

FIG. 3 is a schematic circuit diagram of a conventional color line image sensor using matrix wiring.

In the same Figure, light enters from a document into photosensor elements $Sr_1$–$Sr_n$ (hereinafter referred to as Sr), $Sg_1$–$Sg_n$ (hereinafter referred to as Sg), and $Sb_1$–$Sb_n$ (hereinafter referred to as Sb) through corresponding R, G and B color filters. If a high-level potential is applied to a terminal Tr, and the scanning circuit 4 is driven in the meantime, the output signals of photosensor elements Sr, i.e. signals representative of red components in a line in the document are sequentially output. Subsequently, in similar ways, the respective output signals of sensors Sg and Sb, i.e. signals representative of green and blue components in the same line are sequentially output.

Employment of such matrix wiring serves to reduce the number of output signal lines of the photosensor elements compared with employment of the circuit structure of FIG. 1. However, since the number of photosensor elements increases to three times that of photosensor elements of the monochrome type and each photosensor element requires a switching transistor, a very fine microworking technique is required to form the matrix circuit shown in FIG. 3. In addition, the manufacturing process is complicated and alignment of photosensor elements requires high precision because formation of three wiring patterns, one for the photosensor elements for each color and because of formation of a lamination of these patterns are required. Thus according to this conventional method, a miniaturized low-cost color line image sensor cannot be obtained.

Such a problem does not only occur in color line image sensors. A similar problem will of course occur in color area image sensors as well as in those monochrome type area image sensors which each include a multiplicity of photosensitive elements for high resolution purposes.

SUMMARY OF THE INVENTION

An object of the present invention is to provide a photoelectric conversion apparatus which solves the above prior art problems.

Another object of the present invention is to provide an unprecedented compact photoelectric conversion apparatus.

Still another object of the present invention is to provide a photoelectric conversion apparatus which has stable characteristics and can be produced with high yield.

A further object of the present invention is to provide a miniaturized low-cost color image sensor.

A still further object of the present invention is to provide a photoelectric conversion apparatus in which a plurality of photoelectric conversion elements are arranged in an array, and the outputs of the respective elements are read, the apparatus comprising a plurality of switching elements connected equivalently in parallel with the respective photoelectric conversion elements, the photoelectric conversion elements being connected in series plurality-by-plurality, i.e. the photoelectric conversion elements of a particular row or column being connected in series.

DETAILED DESCRIPTION OF THE PREFERRED EMBODIMENTS

The embodiments of the present invention will be described in more detail with reference to the drawings.

Figure 4:
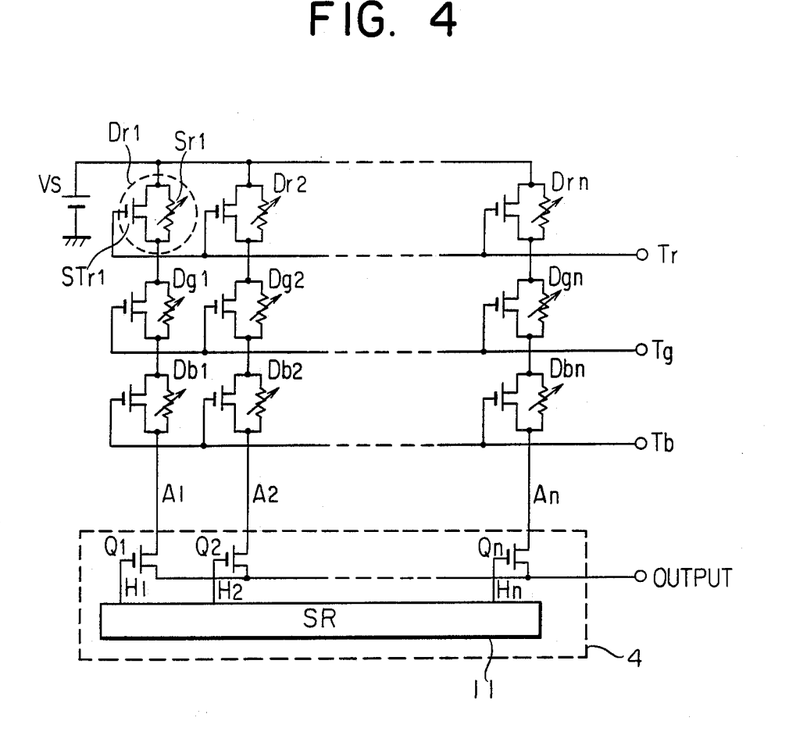
FIG. 4 is an equivalent circuit diagram of a color line image sensor which is a first embodiment of a photoelectric conversion apparatus according to the present invention.

FIG. 4 is an equivalent circuit of a color line sensor which is a first embodiment of a photoelectric conversion apparatus according to the present invention.

In the same Figure, each of the elements D is composed of a photosensitive element S including a photoconductive layer and a switching transistor ST (hereinafter referred to only as transistor ST) connected in parallel with the element S. These elements D are connected, three by three, in series to form a pixel cell. N rows of these pixel cells are arranged and wired in a matrix. In more detail, the gate electrodes of transistors $STr_1$-$STrn$ (hereinafter referred to as transistors STr) in elements $Dr_1$-$Drn$ (hereinafter referred to as elements Dr) are connected to a terminal Tr; the gate electrodes of transistors $STg_1$-$STgn$ (hereinafter referred to as transistors ST) in elements $Dg_1$-$Dqn$ (hereinafter referred to as elements Dg) to a terminal Tg; and the gate electrodes of transistors $STb_1$-$STbn$ (hereinafter referred to as transistors Tb) in elements $DB_1$-$Dbn$ (hereinafter referred to as elements Db) to a terminal Tb. Terminals on one side of the respective pixel cells are connected together to a power supply Vs while the terminals on the other side of the pixel cells are connected via individual electrodes $A_1$-$An$ to scanning circuit 4. This scanning circuit may be a conventional one and, in this case, includes switching transistors $Q_1$-$Qn$ and a shift register 11, having parallel output terminals $H_1$-$Hn$ connected to transistors $Q_1$-$Qn$, respectively. Main electrodes on one side of transistors $Q_1$-$Qn$ are connected to corresponding individual electrodes $A_1$-$An$ while the main electrodes on the other side are connected together to an output terminal OUTPUT.

Three groups of photosensitive elements Sr, Sg and Sb sense red, green and blue color components, respectively, in a line to be read in a document.

The operation of the particular embodiment having the above structure will be described with respect to FIG. 5.

Figure 5:
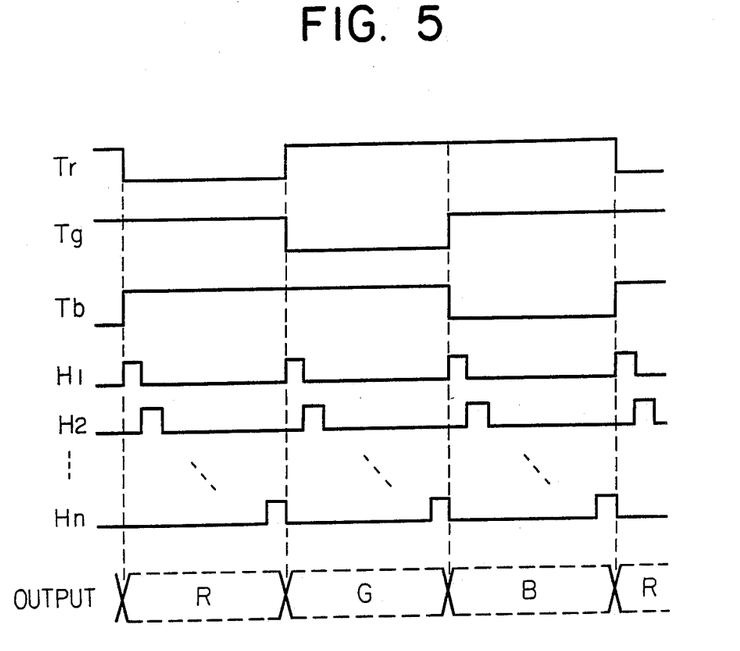
FIG. 5 is a timing chart for explaining the operation of the particular embodiment.

FIG. 5 is a timing chart for explaining the operation of the particular embodiment.

First, a voltage lower than the threshold voltage for transistors STr (hereinafter referred to as low level) is applied to terminal Tr while voltages sufficiently exceeding the threshold voltages for transistors STg. STb (hereinafter referred to as high level) are applied to terminals Tg, Tb, respectively. This causes transistors STr to be turned off and transistors STg and STb to be turned on. Preferably, all of the transistors ST have the same characteristics, the off-resistances of the transistors are at least as high as the dark-state resistance (dark resistance) of the parallel-connected photosensitive elements S, and the on-resistances (bright resistance) of the transistors are 100 to 1000 times lower than the resistances of the photosensitive elements S as irradiated with light (bright resistances).

Under this condition, the output terminals $H_1$-$Hn$ of shift register 11 output signals sequentially which turn on switching transistors $Q_1$-$Qn$ sequentially. First, when transistor $Q_1$ is turned on, a photocurrent (corresponding to a red component signal) R of a color pixel flowing through photosensitive element $Sr_1$ flows out through transistors $STg_1$ and $STb_1$ to individual electrode $A_1$ and is then output through switching transistor $Q_1$ since transistors $STr_1$ is off and transistors $STg_1$ and $STb_1$ are on. In the same way, the respective photocurrents flowing through photosensitive elements $Sr_2$-$Srn$ are output sequentially as red component signals.

Low level is applied to terminal Tg and high levels to terminals Tr and Tb to turn off transistors STg and to turn on transistors STr and STb. Under this condition, scanning circuit 4 is operated in the same way as that mentioned above and the respective photocurrents, flowing through photosensitive elements Sg, are output sequentially as blue component signals G.

Subsequently, low level is applied to terminal Tb and high levels to terminals Tr and Tb. In the same way as that mentioned above, the respective photocurrents flowing through photosensitive elements Sb are output sequentially as blue component signals B.

Thus, the respective red, green and blue color components in the line to be read in the document are converted to the corresponding electric signals.

Figure 6A:
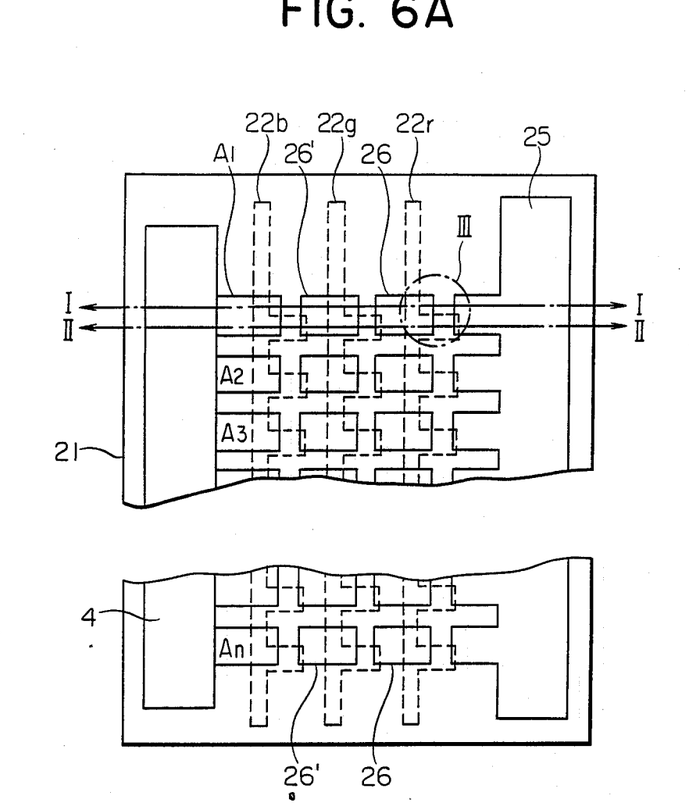
FIG. 6A is a diagrammatic plan view of the embodiment in which the structure of the embodiment is shown.
Figure 6B:
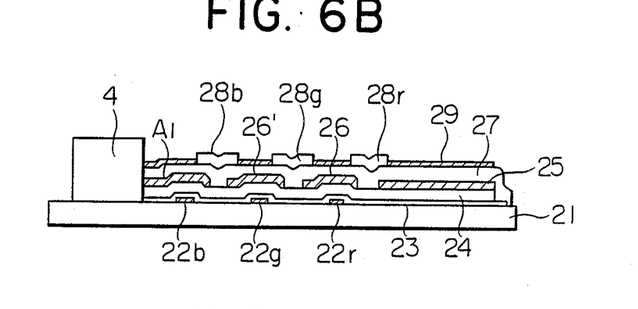
FIG. 6B a cross-sectional view taken along the like I—I of FIG. 6A.
Figure 6C:
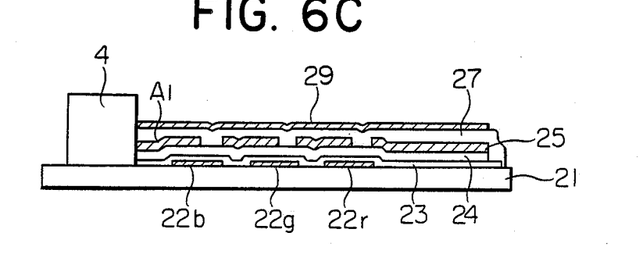
FIG. 6C a cross-sectional view taken along the line II—II of FIG. 6A.

FIG. 6A is a diagrammatic plan view of the first embodiment in which the structure of the embodiment is shown; FIG. 6B a cross-sectional view taken along I—I of FIG. 6A; FIG. 6C a cross-sectional view taken along II—II of FIG. 6A; and FIG. 6D an enlarged view of a single element in a circle 11 of FIG. 6A.

As shown in the respective Figures, the respective gate electrodes 22r, 22g and 22b of switching transistors STr, STg and STb are formed on substrate 21. Formed on these gate electrodes are an insulating layer 23 on which is formed a semiconductor layer 24 of a semiconductor material such as A-Si : H. Formed on layer 24 are common electrode 25 connected to power source Vs, electrodes 26, 26' between which three elements D are connected to series, and individual electrodes $A_1$-$An$ leading from the corresponding pixel cells are formed through an ohmic contact layer. In more detail, the photosensitive elements Sr, Sg and Sb are formed simultaneously on the same surface by using semiconductor layer 24 as a photoconductive layer, and by using parts of the respective spacings formed among common electrode 25, electrodes 26, 26', and individual electrodes $A_1-A_n$ as photosensitive sections. Furthermore, transistors STr, STg and STb connected in parallel with the respective photosensor elements are formed by using semiconductor layer 24 as a semiconductor area for forming a channel and also by using the same electrodes that are mentioned above.

A transparent insulation layer 27 for protection of the thus formed elements D is formed on the elements D. Also, red, green and blue color filters 28r, 28g and 28b are provided on the corresponding photosensitive sections. A light shielding mask 29 is formed on insulation layer 27 except for the places where the filters are positioned.

Figure 6D:
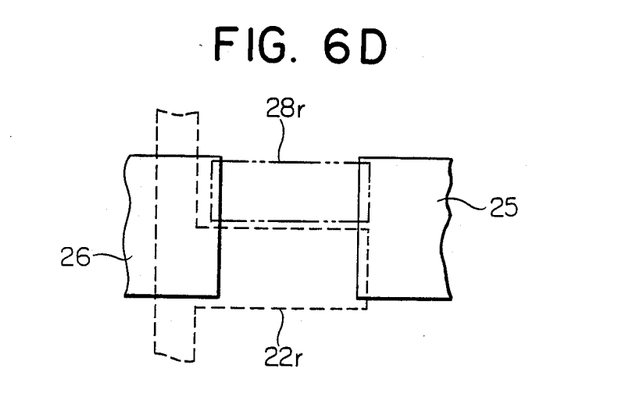
FIG. 6D is an enlarged view of the elements in an encircled area III of FIG. 6A.

As shown in FIG. 6D, for example, transistor $STr_1$ has electrodes 25 and 26 as main electrodes and are turned on or off in accordance with the voltage applied to the gate electrode of that transistor. In photosensitive element $Sr_1$, the resistance between electrodes 25 and 26 is changed in accordance with the quantity of light incident through red filter 28r on semiconductor layer 24 constituting the photosensitive section. That is, photosensitive element $STr_1$ and transistor $STr_1$ are connected equivalently in parallel. In addition, as described herein, the balance in resistances of photosensor elements S and the corresponding transistors ST is improved and a desirable operating state is easily realized by forming photosensitive elements S and transistors ST, each being connected in parallel with a corresponding one of the photosensitive elements, out of the same semiconductor material (here, the same semiconductor layer 24).

If two substrates 21 are each made of a transparent material such as glass, of course, the respective color line image sensors obtained by forming color filters 28r, 28g and 28b on the upper surface of one substrate and by forming color filters 28r, 28g and 28b on the lower surface of the other substrate will have similar effects.

Figure 7:
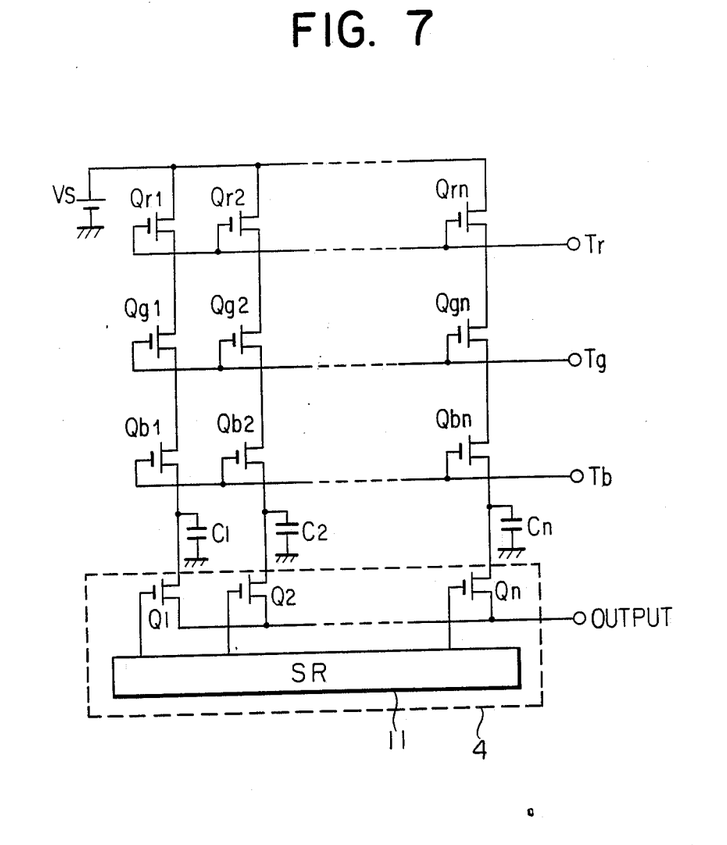
FIG. 7 is a schematic circuit diagram of a color line image sensor which is a second embodiment of the present invention.

FIG. 7 is a schematic circuit diagram of a color line image sensor which is a second embodiment of the present invention.

In the same Figure, this film field effect transistors Qr, Qg and Qb are elements each having the functions of both a photosensitive element and a switching transistor, to be described later, and are the same as elements D of FIG. 4 in an equivalent circuit. Thus the basic drive method is substantially the same as that for the circuit of FIG. 4. In this second embodiment, individual electrodes $A_1-A_n$ are connected to corresponding capacitors $C_1-C_n$.

For example, in order to read a red component signal R, first, low level is applied to terminal Tr to cause transistors Qr to be put under the condition in which no channels are formed in these transistors while high levels are applied to terminals Tg and Tb to cause transistors Qg and Qb to be put under the condition in which channels are formed in these respective transistors. It is arranged that, in the condition in which the channels are formed, the resistance between the main electrodes of each transistor is about three figures lower than that of the photosensitive element irradiated with light so that the current flowing through the transistor is not affected by the incident light. Under such condition, the respective photocurrents corresponding to the quantity of the incident light and flowing through transistors Qr flow through transistors Qg and Qb to capacitors $C_1-C_n$, and the quantities of electric charges corresponding to the respective photocurrents for a fixed interval are stored as red component signals R in capacitors $C_1-C_n$ for a fixed interval. Subsequentially, the respective red component signals thus stored R are sequentially read by operation of scanning circuit 4.

In the same way, low level is applied to terminal Tg, high levels are applied to terminals Tr and Tb, and green composed signals G are read. Low level is applied to terminal Tb, high levels are applied to terminals Tr and Tg, and blue component signals B are read. As described above, since respective color components are temporarily stored in capacitors $C_1-C_n$ and then the thus stored components are read sequentially, high reading is possible if the capacities of capacitors $C_1-C_n$ are selected appropriately.

Figure 8A:
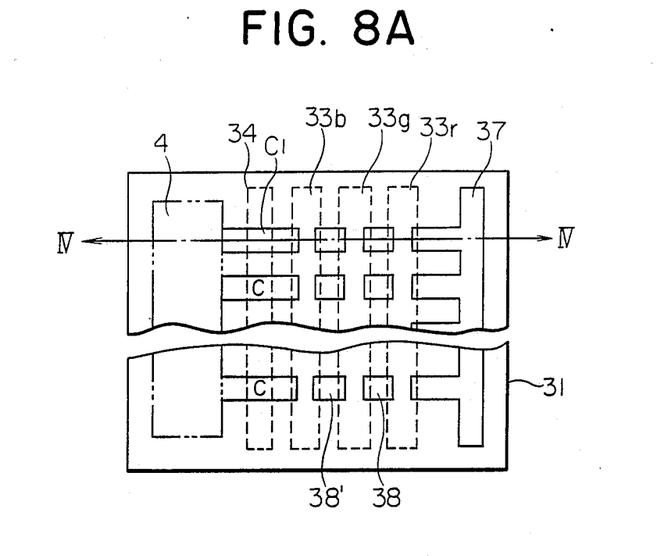
FIG. 8A is a diagrammatic plan view of the structure of the second embodiment.
Figure 8B:
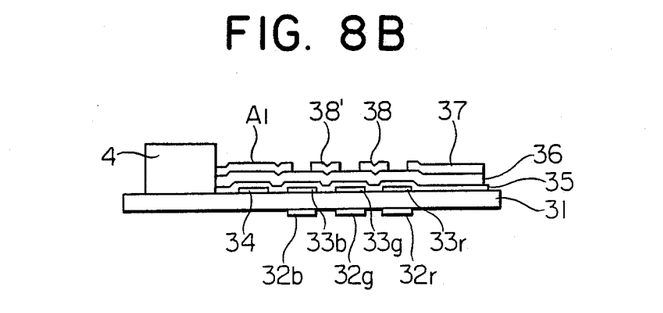
FIG. 8B a cross-sectional view taken along IV—IV of FIG. 8A.

FIG. 8A is a diagrammatic plan view of the structure of the second embodiment and FIG. 8B a cross-sectional view taken along the line IV—IV of FIG. 8A.

In FIGS. 8A and 8B, red, green and blue color filters 32r, 32g and 32b are formed on the lower surface of a transparent substrate 31. Gate electrodes 33r, 33g and 33b are formed at the positions corresponding to those of filters 32r, 32g and 32b on the upper surface of the substrate. A grounding electrode 34 is also formed on the upper substrate. Transparent electrodes such as ITO are used as the gate electrodes.

Formed on the gate and grounding electrodes are an insulating layer 35 on which is formed a semiconductor layer 36 made of a semiconductor material such as a-Si:H. Semiconductor layer 36 is photoconductive and also a semiconductor area to form the channels of field effect transistors Q.

Formed on semiconductor layer 36 are common electrode 37, electrodes 38, 38' to connect field effect transistors Q three by three in series, and individual electrodes $A_1-A_n$ through an ohmic contact layer. Capacitors $C_1-C_n$ are constituted by corresponding individual electrodes $A_1-A_n$ and grounding electrode 34.

In this arrangement, for example, if low level is applied to gate electrode 33r and high levels to gate electrodes 33g and 33b, channels will be formed between electrodes 38 and 38', between electrode 38' and individual electrodes $A_1-A$ and at the interface between semiconductor layer 36 and insulation layer 35 and no channels are formed between electrodes 37 and 38. Thus respective photocurrents corresponding to the quantity of light incident through red color filter 32r and gate electrode 33r on semiconductor layer 36 as a photoconductive layer flow between electrodes 37 and 38 and the quantities of electric charges corresponding to the respective photocurrents are stored in capacitors $C_1-C_n$ as red component signals R. Subsequent reading operation is as mentioned above. The foregoing applies also in the case of green and blue component signals G and B and a similar description will be omitted.

Figure 9:
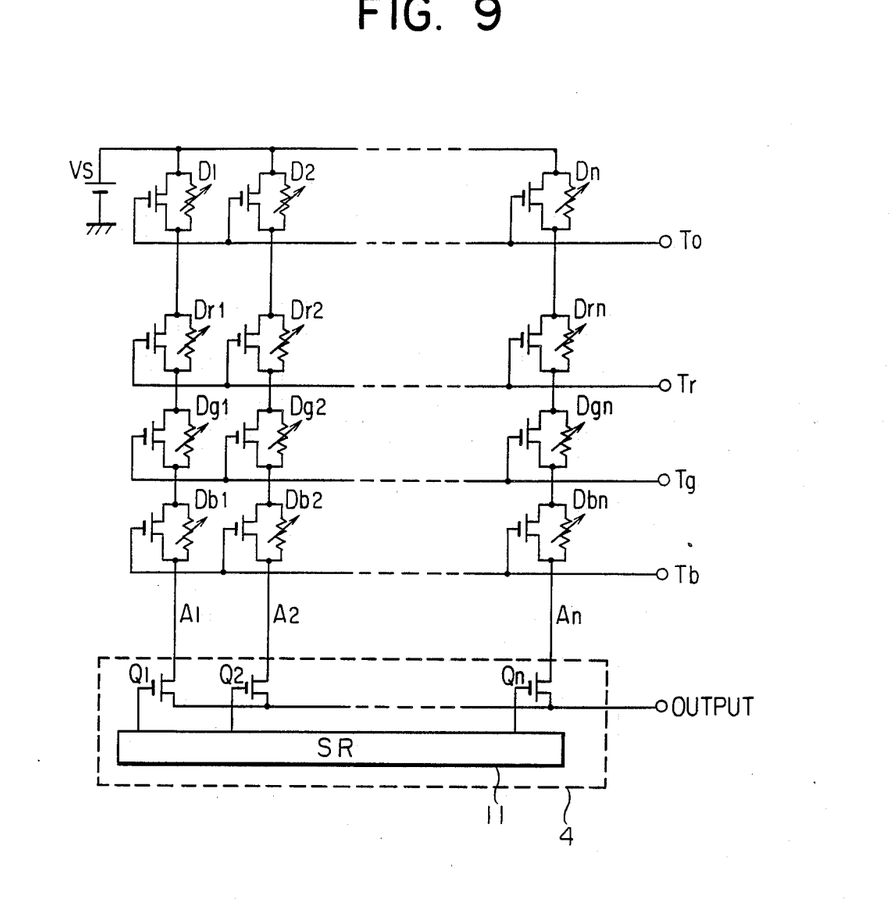
FIG. 9 is an equivalent circuit diagram of a third embodiment of the present invention.

FIG. 9 is an equivalent circuit diagram of a third embodiment of the present invention.

In FIG. 9, the wiring for and structure of elements Dr, Dg and Db are the same as those of the elements of FIG. 4 and 6. In addition, in the third embodiment, elements $D_1-D_n$ are connected in series with the respective pixel cells. In other words, the third embodiment has a structure in which a row of elements $D_1-D_n$ is additionally provided in the plan view shown in FIG. 6. However, no color filters are provided at the respective photosensitive sections of photosensitive elements $S_1-S_n$ in these elements $D_1-D_n$ and the gate electrodes of transistors $ST_1-ST_n$ connected in parallel with the corresponding photosensitive elements $S_1$-$S_n$ are connected together to terminal To.

This third embodiment having such structure can be used as either a monochrome type or a color type. If high levels are applied to terminals Tr, Tg and Tb thereby to turn on all transistors STr, STg and STb, and low level to terminal To thereby to turn off transistors $ST_1$-$ST_n$, monochrome signals can be read from photosensitive elements $S_1$-$S_n$ without color filters. In this case, since the scanning circuit 4 requires only a simple scan in order to read one line, high-speed reading is possible. If high level has been applied to terminal To thereby to turn on transistors $ST_1$-$ST_n$, this embodiment can be used as a color image sensor like the first embodiment shown in FIGS. 4 and 5.

Figure 10:
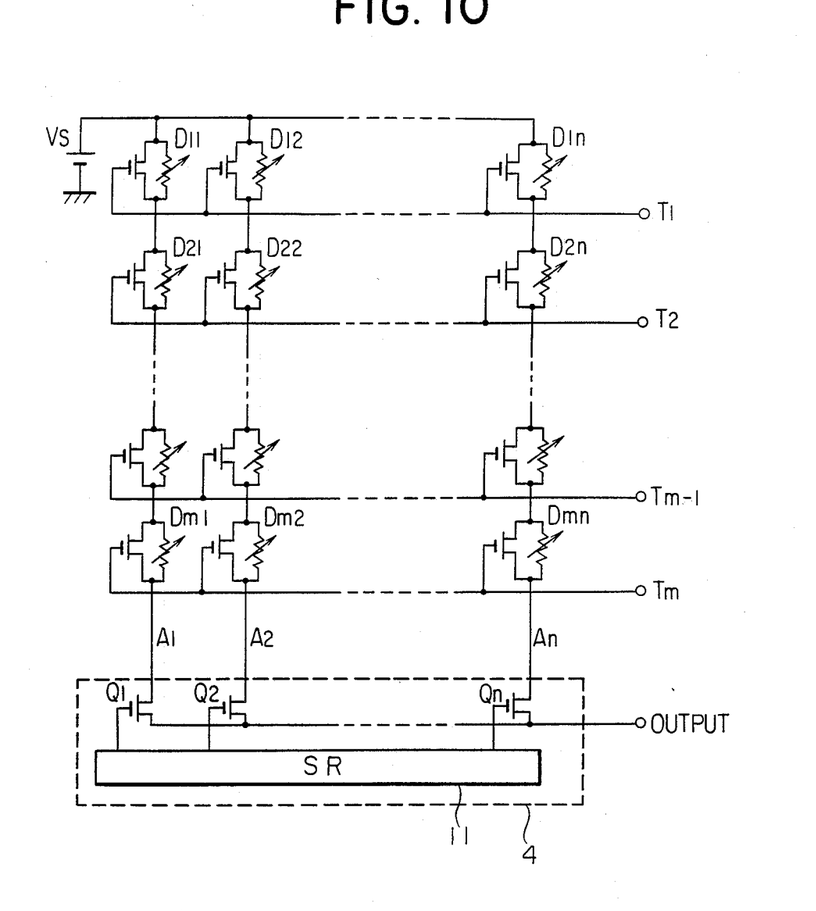
FIG. 10 is an equivalent circuit diagram of a fourth embodiment of the present invention.

FIG. 10 is an equivalent circuit diagram of a fourth embodiment of the present invention. This embodiment is a monochrome type area image sensor which includes an array of m×n elements D, each including a photosensitive element S and a switching transistor ST connected in parallel therewith.

In FIG. 10, the gate electrodes of transistors ST in elements D for the respective rows are connected together to corresponding terminals $T_1$-$T_m$. Elements D are connected in series for the respective columns with terminals on one side of these series connections being connected to power source Vs and with the terminals on the other of the series connections being connected to corresponding individual electrodes $A_1$-$A_n$.

In the operation of the fourth embodiment, as is obvious from the foregoing, high levels are sequentially applied to terminals $T_1$-$T_m$, scanning circuit 4 is operated while high levels are being applied to the gate electrodes of switching transistors ST in a row thereby to sequentially output photocurrents corresponding to the quantity of incident light on that row.

As stated above, the wiring, etc., for many elements D arranged is very simple, so that low-cost area image sensors each having high resolution can be easily manufactured.

As described above in detail, a photoelectric conversion apparatus of the particular embodiment includes switching elements connected equivalently in parallel with corresponding photoelectric conversion elements of a particular row or column which in turn are connected in series. Thus, wiring is greatly simplified. In manufacture, arrangement of photoelectric conversion elements in high density is easy and a miniaturized low-cost apparatus is provided.

When the embodiment is applied to a color sensor, since sensor elements corresponding to respective colors can be arranged very closely on the same plane, the use of especial microworking and multilayered matrix wiring techniques required in the manufacture of conventional color sensors is not required, and the use of a single illumination system is only required and a miniaturized low-cost high-resolution color sensor can be easily provided.

We claim:

1. A photoelectric conversion apparatus comprising a plurality of blocks each of which further comprises:
   a plurality of photoelectric conversion elements having a dark resistance and a bright resistance and connected in series; and
   a plurality of switching elements having an off-resistance and an on-resistance connected equivalently in parallel with and for short circuiting respective ones of said photoelectric conversion elements, wherein the off-resistances of said switching elements are substantially the same as, or more than, the dark resistances of said photoelectric conversion elements, and the on-resistances of said switching elements being about 100 to about 1000 times lower than the bright resistances of said photoelectric conversion elements, wherein at a time a particular photoelectric conversion element is to be read, the other photoelectric conversion elements connected to said particular photoelectric conversion element are short circuited via the respective switching elements, so that a signal is output by said particular photoelectric conversion element.

2. An apparatus according to claim 1, wherein each of said photoelectric conversion elements includes a photoconductive layer, and wherein said switching elements are insulated gate type transistors.

3. An apparatus according to claim 2, wherein the material of each of said photoconductive layers is the same type as a semiconductor material of an active area of said insulating gate type transistor.

4. An apparatus according to claim 3, wherein said materials of said photoconductive layer and said area are hydrogenated amorphous silicon (a-Si:H).

5. An apparatus according to claim 2, wherein a photosensitive face of said photoelectric conversion element is an active area of said insulated gate type transistor.

* * * * *